United States Patent
Rasbornig et al.

(10) Patent No.: US 12,535,516 B2
(45) Date of Patent: Jan. 27, 2026

(54) VEHICLE, FAULT MONITORING DEVICE FOR A VEHICLE AND SEMICONDUCTOR DEVICE FOR DETECTING AN OVERVOLTAGE AND/OR AN OVERCURRENT

(71) Applicant: Infineon Technologies AG, Neubiberg (DE)

(72) Inventors: Friedrich Rasbornig, Klagenfurt (AT); Bernhard Schaffer, Villach (AT)

(73) Assignee: Infineon Technologies AG, Neubiberg (DE)

( * ) Notice: Subject to any disclaimer, the term of this patent is extended or adjusted under 35 U.S.C. 154(b) by 146 days.

(21) Appl. No.: 18/506,602

(22) Filed: Nov. 10, 2023

(65) Prior Publication Data

US 2024/0175909 A1    May 30, 2024

(30) Foreign Application Priority Data

Nov. 24, 2022   (DE) .......................... 102022131083.3

(51) Int. Cl.
| | |
|---|---|
| *G01R 31/00* | (2006.01) |
| *G01R 19/165* | (2006.01) |
| *H02H 7/20* | (2006.01) |
| *G01R 31/70* | (2020.01) |

(52) U.S. Cl.
CPC ..... *G01R 31/006* (2013.01); *G01R 19/16571* (2013.01); *G01R 19/16576* (2013.01); *H02H 7/205* (2013.01)

(58) Field of Classification Search
None
See application file for complete search history.

(56) References Cited

U.S. PATENT DOCUMENTS

| | | | | |
|---|---|---|---|---|
| 8,941,404 | B2* | 1/2015 | Bernardon | G01R 31/52 324/762.01 |
| 9,401,600 | B2* | 7/2016 | Zhang | H05B 47/24 |
| 10,692,543 | B2* | 6/2020 | Na | G11C 16/12 |
| 11,215,156 | B2* | 1/2022 | Ciaccio | H02J 7/342 |
| 11,798,882 | B2* | 10/2023 | Upadhyaya | H01L 23/5256 |
| 12,323,050 | B2* | 6/2025 | Fukuda | H02M 1/32 |
| 2011/0109613 | A1* | 5/2011 | Asai | H04W 52/0261 455/566 |
| 2014/0264807 | A1 | 9/2014 | Iwamura et al. | |
| 2017/0294772 | A1 | 10/2017 | Illing et al. | |
| 2018/0158799 | A1 | 6/2018 | Na et al. | |
| 2018/0182719 | A1 | 6/2018 | Muto et al. | |
| 2021/0218253 | A1* | 7/2021 | Kim | H01M 50/20 |
| 2021/0257283 | A1* | 8/2021 | Na | H01L 23/49575 |
| 2022/0224323 | A1 | 7/2022 | Sievers et al. | |

FOREIGN PATENT DOCUMENTS

JP    2009053081 A    3/2009

* cited by examiner

Primary Examiner — Richard Isla
(74) Attorney, Agent, or Firm — Harrity & Harrity, LLP

(57) ABSTRACT

Example implementations of the present disclosure relate to a vehicle, a fault monitoring device for a vehicle and a semiconductor device for detecting an overvoltage and/or an overcurrent. The semiconductor device includes a first die and a second die, which is configured to detect an overvoltage and/or an overcurrent in the electrical supply and/or communication of the first die. The semiconductor device also includes an output for outputting a signal, which indicates the overvoltage and/or the overcurrent.

20 Claims, 4 Drawing Sheets

VEHICLE, FAULT MONITORING DEVICE FOR A VEHICLE AND SEMICONDUCTOR DEVICE FOR DETECTING AN OVERVOLTAGE AND/OR AN OVERCURRENT

CROSS-REFERENCE TO RELATED APPLICATION

This application claims priority to German Patent Application No. 102022131083.3 filed on Nov. 24, 2022, the content of which is incorporated by reference herein in its entirety.

TECHNICAL FIELD

Example implementations of the present disclosure relate to a vehicle, a fault monitoring device for a vehicle and a semiconductor device for detecting an overvoltage and/or an overcurrent.

BACKGROUND

Solutions for the detection of an overvoltage and/or an overcurrent are used in various technical fields. In particular in vehicle applications, an overvoltage and an overcurrent can lead to safety-critical failures. Therefore, in particular in the case of safety-relevant components, a solution for detecting an overvoltage and an overcurrent may be desired. Such solutions provide for example an additional device for this, which leads to higher costs and additional installation space requirements.

There is therefore a need for an improved concept for detecting an overvoltage and/or an overcurrent.

The attached independent claims take account of this need. Dependent claims refer to advantageous developments.

SUMMARY

Example implementations of the present implementation provide a semiconductor device, including a first die and a second die, which is configured to detect an overvoltage and/or an overcurrent in the electrical supply and/or communication of the first die. The semiconductor device also includes an output for outputting a signal (from the semiconductor device), which indicates the overvoltage and/or the overcurrent. In this way, an occurrence of the overvoltage and/or the overcurrent in the electrical supply and/or communication of the first die can for example be signaled to a control system for the semiconductor device. This allows the control system for example then to take appropriate safety measures in response to a fault or failure of the first die.

The first die may have a certain function for an application of the semiconductor device. In practice, the first die includes for example a sensor, a part of a sensor, a control unit or a part of a control unit. The joint implementation of the second die together with the first die allows the semiconductor device itself to signal the overvoltage, or the overcurrent, and thus makes a separate system in addition to the semiconductor device in favor of cost and component savings superfluous.

A person skilled in the art who benefits from the present disclosure will appreciate that the first and second dies may be arranged differently from one another, depending on an available installation space. In example implementations, the first die and the second die are for example arranged side by side in a plane of the semiconductor package. Alternatively, the first die and the second die may be arranged in superposed planes of the semiconductor device.

The skilled person will also appreciate that the semiconductor device may have different purposes and applications. The first die can correspondingly be any type of die, with any purpose and any function. In the context of the present disclosure, a die may be understood as meaning a piece of semiconductor wafer. In practice, the first die is configured for example as an application-specific integrated circuit. Technically less complex and/or lower-cost technology can then be used for the second die than for the first die.

In some example implementations, the second die may be configured to signal the overvoltage and/or the overcurrent to the first die. This allows the first die to take the measures that inhibit (further) damage and/or overheating of the first die and/or other surrounding components.

Furthermore, the second die may include a controller for controlling the electrical supply of the first die. In this way, in example implementations which provide a controller for the electrical supply of the first die, an existing installation space or an existing chip surface can be exploited particularly favorably.

The output may be configured in practice for connecting to a fault monitoring circuit outside the semiconductor device in order to signal the overvoltage and/or the overcurrent to the fault monitoring circuit using the signal.

In example implementations, the first and the second die may be thermally shielded from each other in order to inhibit heat transfer between the first and the second die in the case of overvoltage and/or an overcurrent. This means that, in the event of an overcurrent and/or overvoltage, (further) thermal damage to the first die can be averted, or at least reduced.

In some example implementations, the second die may include an overcurrent fuse which is configured to protect the first die from an overcurrent. In this way, damage to the first die by the overcurrent can be averted, or at least reduced.

The skilled person will appreciate that the semiconductor device may be provided in particular for fault monitoring in safety-relevant systems or components, in particular in vehicle applications.

Example implementations of the present disclosure correspondingly include a fault monitoring device for a vehicle which includes a semiconductor device (proposed herein). The semiconductor device includes a first die, which is configured as a sensor, and a second die, which is configured to detect an overvoltage and/or an overcurrent in the electrical supply and/or communication of the first die. The semiconductor device also includes an output for outputting a signal, which indicates the overvoltage and/or the overcurrent.

The fault monitoring device may also include a fault monitoring circuit outside the semiconductor device and the output be configured for connecting to a fault monitoring circuit to signal the overvoltage and/or the overcurrent to the fault monitoring circuit using the signal.

As already explained, the first die may be configured as a sensor for a safety-critical component for the vehicle.

Further example implementations provide a vehicle including a fault monitoring device according to the present disclosure.

BRIEF DESCRIPTION OF THE DRAWINGS

A few examples of devices and/or methods are explained in more detail below merely by way of example with reference to the accompanying figures, in which.

DETAILED DESCRIPTION

Figure 1:
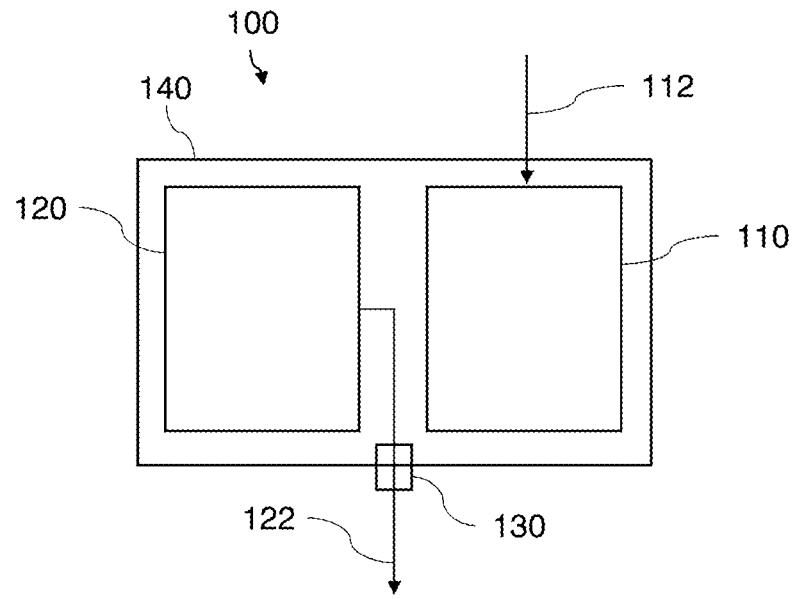
FIG. 1 shows a block diagram for schematic representation of an implementation of a semiconductor device according to the present disclosure.

Some examples are now described in more detail with reference to the accompanying figures. Further possible examples are however not restricted to the features of these implementations that are described in detail. These may contain modifications of the features and equivalents and alternatives to the features. The terminology used herein to describe particular examples is also not intended to be restrictive for further possible examples.

The same or similar reference signs relate throughout the description of the figures to the same or similar elements or features, which may each be implemented identically or else in a modified form, while providing the same or a similar function. In the figures, the thicknesses of lines, layers and/or regions may also be exaggerated for clarification.

When two elements A and B are combined using an "or", this is to be understood as meaning that all possible combinations are disclosed, e.g., only A, only B, and also A and B, unless expressly defined otherwise in the individual case. "At least one of A and B" or "A and/or B" may be used as alternative wording for the same combinations. This applies equivalently to combinations of more than two elements.

If a singular form, e.g., "a, an" and "the", is used, and the use of a single element is neither explicitly nor implicitly defined as mandatory, other examples may also use multiple elements to implement the same function. When a function is described in the following as being implemented using multiple elements, further examples may implement the same function using a single element or a single processing entity. Furthermore, it is understood that the terms "comprises", "comprising", "has" and/or "having" when used describe the presence of the indicated features, whole numbers, steps, operations, processes, elements, components and/or a group thereof, but do not thereby exclude the presence or the addition of one or more further features, whole numbers, steps, operations, processes, elements, components and/or a group thereof.

In practice, safety-critical faults also occur due to overcurrent and/or overvoltage, in particular in safety-relevant applications (e.g., electronic power steering, anti-lock braking system (ABS), etc.) in accordance with the automotive standard ISO 26262. Overcurrent and overvoltage can be understood as meaning a current or voltage which exceeds a desired or predetermined value and/or can lead to damage and/or malfunctions. Solutions to avoid or detect such an overcurrent and/or an overvoltage may in practice provide a suitable separate system, whereby costs and the number of components increase.

In the present case, an improved solution is therefore proposed, one which provides an integration of the detection of an overcurrent and/or an overvoltage in a semiconductor device by an additional die provided for this purpose in the semiconductor device.

Example implementations of the proposed semiconductor device and example applications are explained in more detail below with regard to the accompanying figures.

FIG. 1 shows a block diagram for schematic representation of an example implementation of a semiconductor device 100 according to the present disclosure.

The semiconductor device comprises a first die 110.

The first die 110 may be or comprise a component relevant to a function of the semiconductor device 100, which is why the first die can also be understood in the context of the present disclosure as a "functional component". In vehicle applications, the semiconductor device 100 is for example part of a vehicle sensor system or a control system. The first die 110 may be configured correspondingly as a sensor or a control unit or be part of such a sensor or control unit. In particular in vehicle applications but also in other applications, the semiconductor device 100 and the first die 110 may be relevant to safety. In vehicle applications, the first die 110 serves for example for a steering sensor system or an anti-lock braking system of a vehicle. Correspondingly, it may be provided that the semiconductor device 100 has a certain functional reliability, for example according to the standard ISO (International Organization for Standardization) 26262.

For this purpose, the semiconductor device 100 provides a second die 120, which is configured to detect an overvoltage and/or an overcurrent in the electrical supply and/or communication of the first die 110, and an output 130 for outputting a signal 122, which indicates the overvoltage and/or the overcurrent. For this purpose, the second die 120 has for example a corresponding circuit for comparing the electrical supply or communication with a maximum acceptable value for a voltage and/or a current in the electrical supply and/or communication of the first die 110. The skilled person will appreciate that a corresponding circuit can be implemented in various ways. Examples of such a circuit provide for example a comparator and/or one or more diodes for this purpose.

When an overcurrent and/or overvoltage is detected, the second die then generates the signal 122, which indicates the occurrence of the overcurrent and/or the overvoltage and is output via the output 130. In practice, the signal 122 is for example transmitted to a fault monitoring circuit (not shown) for reporting the overcurrent and/or overvoltage in order to take safety-relevant measures in response to this. In this case, the fault monitoring circuit may for example provide for switching to a safety mode. The fault monitoring circuit is for example implemented in a control device which is configured for carrying out such measures.

The proposed approach, also to be understood as a "dual-die approach", allows on the one hand a detection of an overload by an overcurrent and/or an overvoltage at the level of the semiconductor device 100, whereby faults or failures at the level of a system in which the semiconductor device 100 is integrated can be avoided, or at least prevented. For example, this may allow the avoidance of system-level faults which, when using a short PWM code (SPC) ID protocol (PWM=pulse wave modulated), cause a loss of function of other components in addition to the semiconductor device 100. Similarly, other protocols with equivalent functionality can be used—for example an SPI protocol (SPI=serial peripheral interface) or a PSI5 protocol (PSI5=Peripheral Sensor Interface 5). A system-level fault occurs for example in the event of a loss of function of other sensor devices and causes for example a failure of an entire system, e.g., the entire electric power steering (EPS) system or other safety-relevant systems. The proposed approach can achieve a higher degree of functional safety, for example to meet a desired degree of functional safety, for example a certain Automotive Safety Integrity Level (ASIL) (e.g., ASIL A, ASIL B, ASIL C, ASIL D).

On the other hand, the proposed approach provides fault detection at the component level, eliminating the need for external overcurrent/overvoltage detection, which can result in a reduced number of components or a reduced parts list. The separation between the first and the second die for the detection of an overcurrent and/or an overvoltage also allows the avoidance of overheating of the first die and/or another die. Moreover, the proposed approach offers the possibility of implementing control units, such as for example HV voltage controllers, on a separate (second) die. In example implementations, the control device and/or the detection of the overcurrent and/or the overvoltage is technically simpler to implement than a function of the first die (because of the lower number of components). The skilled person will appreciate that, in such cases technically simpler and lower-cost technology can be used for the second die than for the first die. In practice, ASIC technology (ASIC=application-specific integrated circuit) may be used for example for the first die. The first die may therefore be configured as or comprise an application-specific circuit. Technically simpler technology can be used for the second die, relocating the fault detection to the second die allowing a decrease in the technical effort and costs for the production of the first die. By using the separate second die, the technical effort for providing the semiconductor device 100 can thus be lower overall than in the case of implementation on a single die. After an overcurrent and/or overvoltage has occurred at the first die, it can for example be individually replaced, which allows easier and lower-cost maintenance and thus greater sustainability.

By implementing the overvoltage/overcurrent detection and/or the control unit on the second die, more space for additional components remains on the first die than in the case of implementation on a single die.

In example implementations, the first and the second die are then arranged in a common housing 140 or are enclosed by the housing 140 of a semiconductor package. The output 130 comprises in practice for example at least one interface for connecting to the fault monitoring device. In example implementations, the interface may be a wireless or wired interface. In the present case, the interface comprises for example a socket or a plug for wired connection to the fault monitoring device outside (e.g., external to) the housing 140.

In principle, the proposed approach can be used in various applications. By way of example, a possible application in relation to FIGS. 2*a* and 2*b* is explained in more detail below.

Figure 2A:
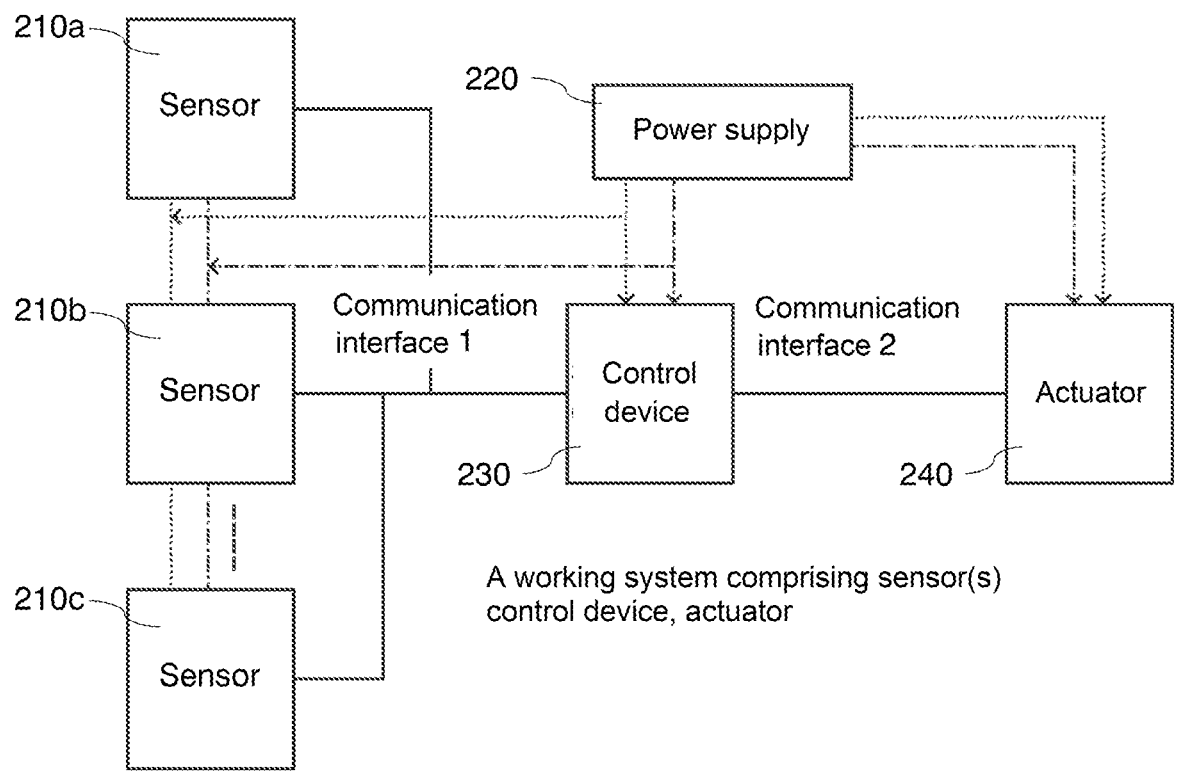
FIGS. 2a and 2b each show a block diagram for schematic representation of an application environment of the proposed semiconductor device.
Figure 2B:
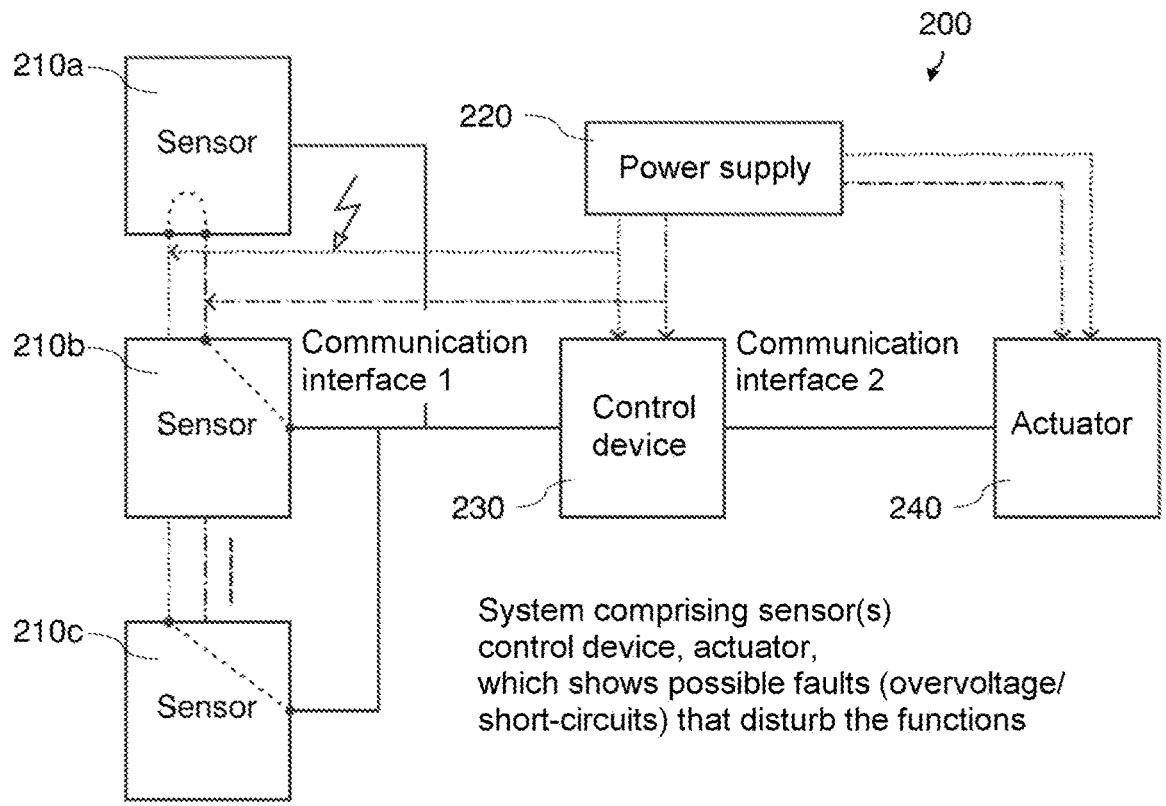

FIGS. 2*a* and 2*b* each show a block diagram for schematic representation of an application environment 200 of the proposed semiconductor device. FIG. 2*a* schematically shows a fault-free state and FIG. 2*b* shows a fault state of the application environment.

As shown in FIG. 2*a*, the application environment 200 comprises for example a system with multiple sensors 210*a*, 210*b* and 210*c*, a control device ("controller") 230 for controlling an actuator 240 and a supply device 220 for the electrical supply. In practice, the control device 230 is configured for example to control the actuator 240 based on measured values of the sensors 210*a*, 210*b* and 210*c*. For this purpose, the sensors 210*a*, 210*b* and 210*c* and the actuator 240 are each interconnected in parallel via a communication interface ("communication interface ½") and connected to the control device 230. For the electrical supply, the sensors 210*a*, 210*b* and 210*c*, the control device 230 and the actuator 240 are each connected to the supply device 220.

Examples of the present system are used for an electric steering system, the sensors 210*a*. 210*b* and 210*c* detecting measured values based on which the control device 230 controls the actuator 240 for controlling the electric steering system. The sensors 210*a*, 210*b* and 210*c* may serve for example for measuring a steering angle and/or other parameters of the steering system and the actuator for actuating the electric steering system.

As indicated in FIG. 2*b* by dashed lines, defects or damage can lead to short circuits of lines of the electrical supply and/or between lines of the electrical supply and the communication interface. This can lead to an overvoltage and/or an overcurrent and, as a result, to damage of components that are not directly affected by a short circuit due to overheating or faulty currents. In the present case, for example an overvoltage and/or an overcurrent at one of the sensors may have the effect that one or more other sensors are damaged. This can result in an undesirable and complete system failure.

The proposed semiconductor device can be used in particular to avoid such cases or to prevent such a case. In practice, the proposed semiconductor device is implemented for example in one or more of the sensors 210*a*, 210*b* and 210*c*, in order to detect an overcurrent or an overvoltage already at the component level, that is to say at the sensor level, and thus prevent a total failure of the entire system. In this case, the first die is for example configured as part of the sensor 210*a*, 210*b* or 210*c* and the second die is configured to detect and report an overcurrent or an overvoltage, as in the fault case shown. For this purpose, the semiconductor device can send the corresponding signal for example to the control device 230. If required, the semiconductor device or the second die can separate the faulty sensor, that is to say the one in which the overvoltage and/or the overcurrent has occurred, from the electrical supply in order to avert overheating and further damage. When an overcurrent and/or overvoltage has been reported, the control device 230 can adjust operation of the system correspondingly to take appropriate measures in the event of a sensor failing.

For the semiconductor device, in principle different architectures come into consideration, as is explained in more detail with reference to FIGS. 3*a* and 3*b*.

Figure 3A:
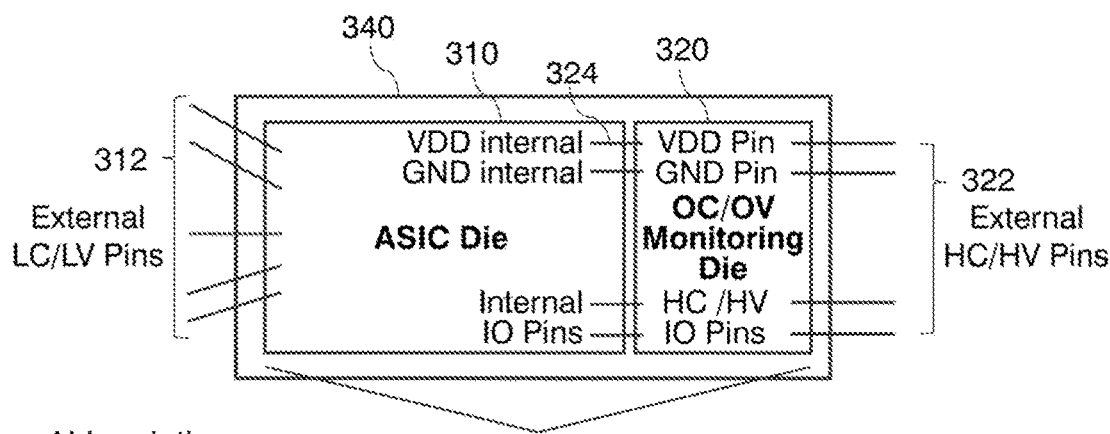
FIGS. 3a and 3b each show a block diagram for schematic representation of a further example implementation of the proposed semiconductor device with different arrangements of dies of the semiconductor device.

FIG. 3*a* shows a block diagram for schematic representation of a further example implementation of the proposed semiconductor device, with a first die 310 and a second die 320 in a housing 340 in a view perpendicular to the chip plane of the semiconductor device.

The first die 310 is for example configured as an ASIC and is therefore also referred to in the present case as an "ASIC die". The second die 320 for overcurrent and/or overvoltage monitoring is referred to in the present case as the "OC/OV monitoring die".

As shown, the second die 320 has multiple inputs 322 for communication and an electrical supply from outside the housing 340. The inputs 322, comprising inputs for an electrical supply ("VDD pin"), an input for grounding ("GND pin"), a high-current/high-voltage input ("HC/HV") for supplying high voltage (generally >1 kV AC or 1.5 kV DC, in vehicle technology>30 V AC or >60 V DC) and input and output interfaces ("IO pins"). Furthermore, the semiconductor device comprises connections between the first and the second die 310 and 320 for (internal) forwarding communication and the electrical supply to the first die 310. For this purpose, the first die 310 has corresponding inputs ("VDD Internal", "GND Internal", "Internal", "IO Pins"). In this way, the first die 310 is supplied with electrical power and connected to the communication (e.g., with a control device) via the second die 320. The second die 320 is thus connected in series upstream of the first die 310 for communication and electrical supply. In this way, the second die 320 can detect an overvoltage and/or an overcurrent and, unlike a parallel-connected external device for detecting an overcurrent and/or an overvoltage, if required provide an immediate interruption before the overvoltage or the overcurrent reaches the first die 310 and/or damages it.

In the case of an overcurrent and/or an overvoltage, the second die 320 may for example interrupt a corresponding connection to the first die 310 immediately upon occurrence of the overcurrent and/or the overvoltage, in order to prevent the overcurrent and/or the overvoltage from reaching the first die 310 and/or damaging it. For this purpose, the second die 320 comprises a corresponding protective device for protecting the first die 310 from an overvoltage and/or an overcurrent. The protective device comprises for example an overcurrent fuse.

In addition, the second die 320 may bring about the transition to a safe state, for example by interrupting communication with the control device. In sensor applications, this can prevent incorrect measured values because of the overcurrent and/or overvoltage from being transmitted. When used in vehicles, in this way impairment of the handling characteristics can be avoided.

In addition, the proposed interconnection of the first and the second die 310 and 320 allows the implementation of a controller for controlling an electrical supply of the first die 310. Correspondingly, a controller can in practice be implemented on the first die 310 for the benefit of a larger installation space and on the second die 320 for the benefit of a lower technical effort. In the present example, the controller is for example configured to control a supply voltage VDD and/or the high voltage for the first die 310 to a predetermined value.

The first and the second die 310 and 320 can also be thermally shielded from each other in practice to prevent damage caused by heat transfer between the first and the second die 310 and 320. For this purpose, the first and second die 310 and 320 may be separated from each other by thermal insulation.

The first die also comprises low-current/low-voltage interfaces ("External LC/LV Pins"), which serve a function of the semiconductor device and/or the communication with the control device.

As can be seen from the arrangement of the first and the second die 310 and 320, the first and second die 310 and 320 can be arranged side by side in a plane (chip/die plane) of the semiconductor device, which allows a lower height of the semiconductor device compared to a stacked arrangement of the dies.

Figure 3B:
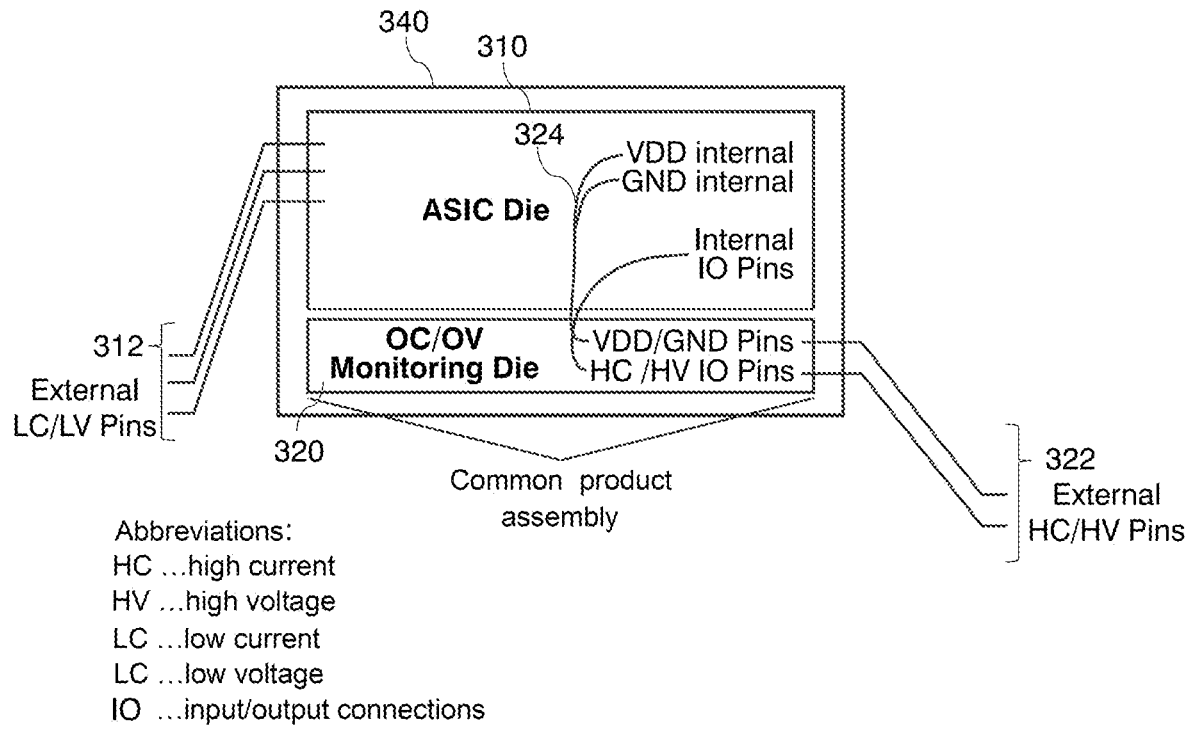

As shown in FIG. 3b, which illustrates an example implementation of the semiconductor device from a side view parallel to the chip plane, the first die 310 and the second die 320 may be arranged in superposed planes of the semiconductor device, that is to say in a stacked arrangement. As shown, the first die 310 may be arranged on the second die 320. Optionally, the dies 310 and 320 may, however, also be arranged the other way around. Due to the stacked arrangement, installation space in the width can be advantageously saved.

In the present case, the first die is for example part of a sensor system, a control unit or another safety-critical component. The skilled person will appreciate that the semiconductor device can be used for various applications. In particular, the proposed semiconductor device can be used in vehicles, it being possible for example for the first die to be configured as a sensor or part of a sensor for a safety-critical component for a vehicle. In principle, however, other applications also come into consideration. The first and the second die 310 and 320 can therefore also be configured differently, depending on the respective application. The architecture described should therefore only be seen as a configuration of various example implementations given by way of example. In practice, however, their structure may differ from the explanations given and may for example have other inputs and/or outputs or a different number of inputs or outputs. The dies may also have different designs and/or different technology may be used for implementing an electronic circuit or an integrated electronic circuit on the first and/or the second die.

Figure 4:
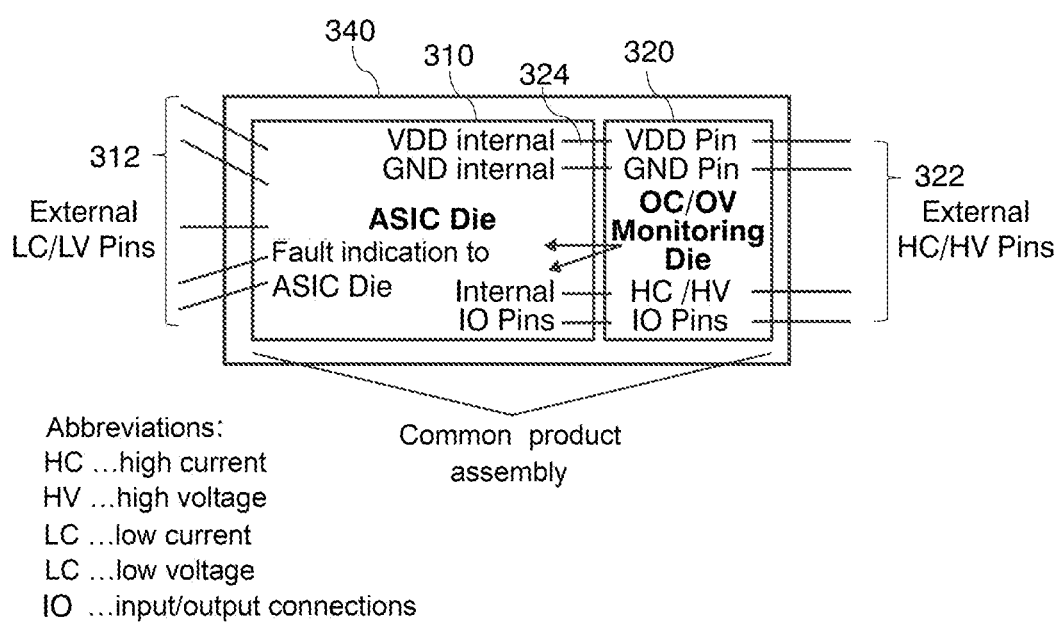
FIG. 4 shows a block diagram for schematic representation of another example implementation of the proposed semiconductor device.

Likewise, the overcurrent and/or the overvoltage can be reported in different ways and/or over different paths. In practice, the second die 320 may be directly connected to the output for immediately outputting the signal to indicate the overcurrent and/or the overvoltage (see FIG. 1). Optionally, however, an existing connection of the first die 310 to the fault monitoring device may also be used for this purpose. As shown using a further example implementation of the semiconductor device in FIG. 4, it may be provided for this purpose that the second die 320 signals the overcurrent and/or the overvoltage to the first die 310. A separate connection 326, intended for this purpose, is for example provided for this. Alternatively, an already existing connection for the communication of the first die 310 may also be used again for this.

Similarly, an overcurrent fuse of the semiconductor device can be implemented in various ways, one possible implementation of which is explained in more detail below by way of example with reference to FIG. 5.

Figure 5:
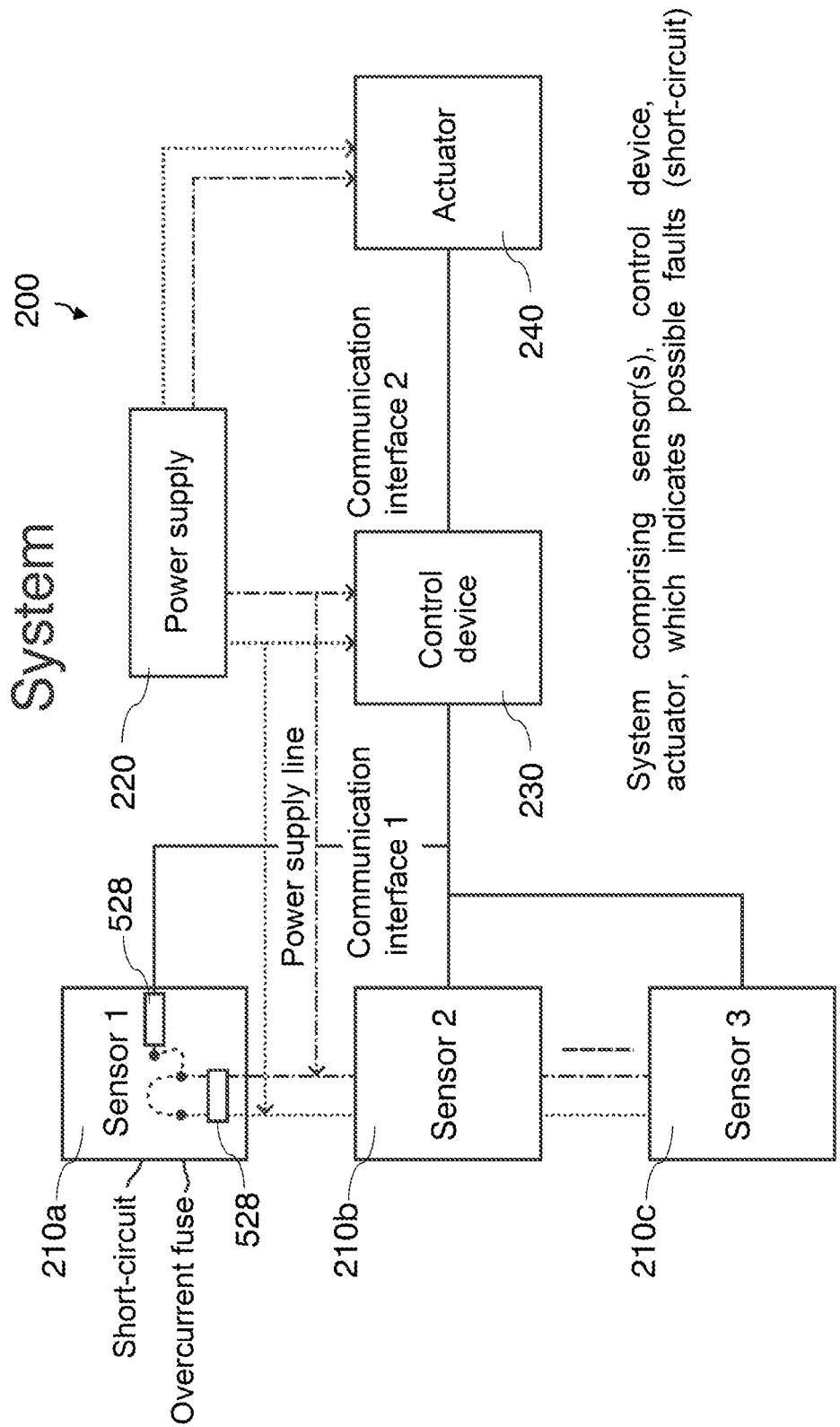
FIG. 5 shows a block diagram for schematic representation of an application scenario of an example implementation of the proposed semiconductor device.

FIG. 5 shows by way of example an application of the proposed approach in the application environment from FIG. 2. As shown, the proposed semiconductor device may for example be applied in the case of the sensor 210a. As indicated by dashed lines, in practice a fault or defect can cause a short circuit in the sensor 210a between lines for the electrical supply and/or a short circuit between the electrical supply and a communication line of the sensor 210a, resulting in undesired overcurrent and/or undesired overvoltage. As shown in FIG. 5, the second die provides one or more overcurrent fuses 528, which in this case protect the first die and/or other components from the overcurrent and/or the overvoltage. For this purpose, the overcurrent fuses 528 are configured for example to specifically interrupt the supply lines to the first die and to specifically divert the overvoltage and/or the overcurrent. In particular, this can prevent other components of the application environment, for example other sensors 210b and 210c, which are connected in parallel with the sensor 210a via the communication interface and are affected by an overcurrent and/or an overvoltage in the communication interface, from likewise being affected by the overcurrent and/or the overvoltage in the sensor 210a and possibly failing and/or being damaged.

The proposed semiconductor device may in practice be implemented in practice in multiple components of a system. Referring to the application environment of FIGS. 2 and 5, the proposed semiconductor device may be implemented for example in multiple sensors and/or the actuator.

As already mentioned, the proposed semiconductor device may be used in particular in vehicles for fault detection.

Correspondingly, example implementations provide a fault monitoring device for a vehicle which comprises the proposed semiconductor device with a first die, which is configured as a sensor or part of a sensor, a second die, which is configured to detect an overvoltage and/or an overcurrent in the electrical supply and/or communication of the first die, and an output for outputting a signal, which indicates the overvoltage and/or overcurrent.

In practice, the fault monitoring device may be implemented in particular with a corresponding fault monitoring circuit outside the semiconductor device. In this case, the output is configured for connecting to a fault monitoring circuit in order to signal the overvoltage and/or the overcurrent to the fault monitoring circuit using the signal. For monitoring a system with multiple components, the fault monitoring circuit may in this way be connected to multiple semiconductor devices of the components. Upon occurrence of a fault, that is to say an overcurrent and/or an overvoltage, the fault monitoring circuit can then take appropriate measures, which comprise for example an output of a warning, a transition to a safe state or a transition to an emergency mode.

ASPECTS

The following provides an overview of some Aspects of the present disclosure:

Aspect 1: A semiconductor device, comprising: a first die; a second die configured to detect at least one of an overvoltage or an overcurrent in at least one of an electrical supply or a communication of the first die; and an output configured to output a signal, which indicates that at least one of the overvoltage or the overcurrent has been detected by the second die.

Aspect 2: The semiconductor device as claimed in Aspect 1, wherein the first die and the second die are arranged in a semiconductor package, and wherein the first die and the second die are arranged side by side in a plane of the semiconductor package.

Aspect 3: The semiconductor device as claimed in any of Aspects 1-2, wherein the first die and the second die are arranged in a semiconductor package, and wherein the first die and the second die are arranged in superposed planes of the semiconductor device.

Aspect 4: The semiconductor device as claimed in any of Aspects 1-3, wherein the first die is configured as an application-specific integrated circuit.

Aspect 5: The semiconductor device as claimed in any of Aspects 1-4, wherein the first die is configured as a sensor.

Aspect 6: The semiconductor device as claimed in any of Aspects 1-5, wherein the first die is configured as a sensor for a safety-critical component for a vehicle.

Aspect 7: The semiconductor device as claimed in any of Aspects 1-6, wherein the first die is configured as a control unit.

Aspect 8: The semiconductor device as claimed in any of Aspects 1-7, wherein the second die is configured to signal at least one of the overvoltage or the overcurrent to the first die based on detecting at least one of the overvoltage or the overcurrent, respectively.

Aspect 9: The semiconductor device as claimed in any of Aspects 1-8, wherein the second die comprises a controller for controlling the electrical supply of the first die.

Aspect 10: The semiconductor device as claimed in any of Aspects 1-9, wherein the output is configured to connect to a fault monitoring circuit outside of the semiconductor device to signal at least one of the overvoltage or the overcurrent to the fault monitoring circuit using the signal.

Aspect 11: The semiconductor device as claimed in any of Aspects 1-10, wherein the first die and the second die are thermally shielded from each other.

Aspect 12: The semiconductor device as claimed in any of Aspects 1-11, wherein the second die comprises an overcurrent fuse, wherein the overcurrent fuse is configured to protect the first die from the overcurrent.

Aspect 13: A fault monitoring device for a vehicle, the fault monitoring device comprising: a semiconductor device comprising: a first die, which is configured as a sensor; a second die, which is configured to detect at least one of an overvoltage or an overcurrent in at least one of an electrical supply or a communication of the first die; and an output configured to output a signal, which indicates that at least one of the overvoltage or the overcurrent has been detected by the second die.

Aspect 14: The fault monitoring device as claimed in Aspect 13, wherein the fault monitoring device further comprises a fault monitoring circuit arranged outside the semiconductor device, wherein the output is connected to the fault monitoring circuit, and wherein the output is configured to signal at least one of the overvoltage or the overcurrent to the fault monitoring circuit using the signal.

Aspect 15: The fault monitoring device as claimed in any of Aspects 13-14, wherein the first die is configured for a safety-critical component of the vehicle.

Aspect 16: A vehicle, comprising: a fault monitoring device, wherein the fault monitoring device comprises: a semiconductor device comprising: a first die, which is configured as a sensor; a second die, which is configured to detect at least one of an overvoltage or an overcurrent in at least one of an electrical supply or a communication of the first die; and an output configured to output a signal, which indicates that at least one of the overvoltage or the overcurrent has been detected by the second die.

Aspect 17: The vehicle as claimed in Aspect 16, wherein the fault monitoring device further comprises a fault monitoring circuit arranged outside of the semiconductor device, wherein the output is connected to the fault monitoring circuit, and wherein the output is configured to signal at least one of the overvoltage or the overcurrent to the fault monitoring circuit using the signal.

Aspect 18: The vehicle as claimed in any of Aspects 16-17, wherein the first die is configured for a safety-critical component of the vehicle.

Aspect 19: A system configured to perform one or more operations recited in one or more of Aspects 1-18.

Aspect 20: An apparatus comprising means for performing one or more operations recited in one or more of Aspects 1-18.

The aspects and features described in connection with a particular one of the previous examples may also be combined with one or more of the other examples to replace an identical or similar feature of this other example or to introduce the feature additionally into the other example.

Examples may also be or relate to a (computer) program with a program code for performing one or more of the above methods or refer to it when the program is running on a computer, processor, or other programmable hardware component. This means that steps, operations, or processes of various of the methods described above can also be performed by programmed computers, processors, or other programmable hardware components. Examples may also cover program memory devices, e.g., digital data storage media, which are machine-, processor- or computer-readable and which encode or contain machine-executable, processor-executable or computer-executable programs and instructions. The program memory devices may comprise or be e.g., digital memories, magnetic storage media, such as for example magnetic disks and magnetic tapes, hard disk drives or optically readable digital data storage media. Other examples may also cover computers, processors, control units, field-programmable logic arrays ((F)PLAs=(Field) Programmable Logic Arrays), field-programmable gate arrays ((F)PGA=(Field) Programmable Gate Arrays), graphics processors (GPU=Graphics Processor Unit), application-specific integrated circuits (ASIC=application-specific integrated circuit), integrated circuits (IC=Integrated Circuit), or one-chip systems (SoC=System-on-a-Chip) which are programmed to perform the steps in the methods described above.

It is also goes without saying that the disclosure of multiple steps, processes, operations or functions disclosed in the description or claims shall not be construed as mandatory in the sequence described, unless this is explicitly stated in the individual case or is mandatory for technical reasons. Therefore, the previous description does not restrict the execution of multiple steps or functions to a specific sequence. Further, in other examples, a single step, a single function, a single process or a single operation may include and/or be broken into multiple substeps, functions, processes or operations.

If some aspects have been described in the preceding sections in connection with a device or system, these aspects are also to be understood as a description of the corresponding method. In this case, for example, a block, a device or a functional aspect of the device or the system may correspond to a feature, such as a method step, of the corresponding method. Correspondingly, aspects described in connection with a method are also to be understood as a description of a corresponding block, element, property or functional feature of a corresponding device or system.

The following claims are hereby incorporated into the detailed description, each claim being independent as a separate example. It should also be noted that—although a dependent claim in the claims refers to a particular combination with one or more other claims—other examples may also comprise a combination of the dependent claim with the subject-matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A semiconductor device, comprising:
a first die comprising a plurality of sensors and a communication interface, wherein each sensor of the plurality of sensors has one or more lines of electrical supply and is coupled to the communication interface;
a second die configured to detect, at a sensor level of the first die, at least one of an overvoltage or an overcurrent in at least one of an electrical supply or a communication of the first die, wherein the overvoltage or the overcurrent is caused by a short circuit at the plurality of sensors between two lines of electrical supply or between a line of electrical supply and the communication interface,
wherein the second die is configured to determine which sensor of the plurality of sensors is associated with the overvoltage or the overcurrent, and thus, is a faulty sensor; and
an output configured to output a signal, which indicates that at least one of the overvoltage or the overcurrent has been detected by the second die.

2. The semiconductor device as claimed in claim 1, wherein the first die and the second die are arranged in a semiconductor package, and
wherein the first die and the second die are arranged side by side in a plane of the semiconductor package.

3. The semiconductor device as claimed in claim 1, wherein the first die and the second die are arranged in a semiconductor package, and
wherein the first die and the second die are arranged in superposed planes of the semiconductor device.

4. The semiconductor device as claimed in claim 1, wherein the first die is configured as an application-specific integrated circuit.

5. The semiconductor device as claimed in claim 1, wherein the first die is configured as a sensor die for a safety-critical component for a vehicle.

6. The semiconductor device as claimed in claim 1, wherein the first die is configured as a control unit.

7. The semiconductor device as claimed in claim 1, wherein the second die is configured to signal at least one of the overvoltage or the overcurrent to the first die based on detecting at least one of the overvoltage or the overcurrent, respectively.

8. The semiconductor device as claimed in claim 1, wherein the second die comprises a controller for controlling the electrical supply of the first die.

9. The semiconductor device as claimed in claim 1, wherein the output is configured to connect to a fault monitoring circuit outside of the semiconductor device to signal at least one of the overvoltage or the overcurrent to the fault monitoring circuit using the signal.

10. The semiconductor device as claimed in claim 1, wherein the first die and the second die are thermally shielded from each other.

11. The semiconductor device as claimed in claim 1, wherein the second die comprises an overcurrent fuse, wherein the overcurrent fuse is configured to protect the first die from the overcurrent.

12. The semiconductor device as claimed in claim 1, wherein the second die is configured to separate the faulty sensor from an electrical supply and maintain remaining sensors of the plurality of sensors connected to the electrical supply.

13. The semiconductor device as claimed in claim 1, wherein the second die includes external pins for communications and electrical supply and internal pins coupled to the first die for providing the communications and the electrical supply to the first die such that the second die and the first die are coupled in series for the communications and the electrical supply received from the external pins, the second die being connected upstream from the first die.

14. The semiconductor device as claimed in claim 13, wherein the second die is configured to, based on detecting the overvoltage or the overcurrent, interrupt a corresponding connection, associated with the overvoltage or the overcurrent, to the first die.

15. A fault monitoring device for a vehicle, the fault monitoring device comprising:
a semiconductor device comprising:
a first die, which is configured as a sensor device comprising a plurality of sensors and a communication interface, wherein each sensor of the plurality of sensors has one or more lines of electrical supply and is coupled to the communication interface;
a second die, which is configured to detect, at a sensor level of the first die, at least one of an overvoltage or an overcurrent in at least one of an electrical supply or a communication of the first die, wherein the overvoltage or the overcurrent is caused by a short circuit at the plurality of sensors between two lines of electrical supply or between a line of electrical supply and the communication interface,
wherein the second die is configured to determine which sensor of the plurality of sensors is associated with the overvoltage or the overcurrent, and thus, is a faulty sensor; and
an output configured to output a signal, which indicates that at least one of the overvoltage or the overcurrent has been detected by the second die.

16. The fault monitoring device as claimed in claim 15, wherein the fault monitoring device further comprises:
a fault monitoring circuit arranged outside the semiconductor device,
wherein the output is connected to the fault monitoring circuit, and
wherein the output is configured to signal at least one of the overvoltage or the overcurrent to the fault monitoring circuit using the signal.

17. The fault monitoring device as claimed in claim 15, wherein the first die is configured for a safety-critical component of the vehicle.

18. The fault monitoring device as claimed in claim 15, wherein the second die includes external pins for communications and electrical supply and internal pins coupled to the first die for providing the communications and the electrical supply to the first die such that the second die and the first die are coupled in series for the communications and the electrical supply received from the external pins, the second die being connected upstream from the first die.

19. A vehicle, comprising:
a fault monitoring device, wherein the fault monitoring device comprises:
a semiconductor device comprising:
a first die, which is configured as a sensor device comprising a plurality of sensors and a communication interface, wherein each sensor of the plurality of sensors has one or more lines of electrical supply and is coupled to the communication interface;
a second die, which is configured to detect, at a sensor level of the first die, at least one of an overvoltage or an overcurrent in at least one of an electrical supply or a communication of the first die, wherein the overvoltage or the overcurrent is caused by a short circuit at the plurality of sensors between two lines of electrical supply or between a line of electrical supply and the communication interface,
wherein the second die is configured to determine which sensor of the plurality of sensors is associated with the overvoltage or the overcurrent, and thus, is a faulty sensor; and
an output configured to output a signal, which indicates that at least one of the overvoltage or the overcurrent has been detected by the second die.

20. The vehicle as claimed in claim 19, wherein the fault monitoring device further comprises:
a fault monitoring circuit arranged outside of the semiconductor device,
wherein the output is connected to the fault monitoring circuit, and
wherein the output is configured to signal at least one of the overvoltage or the overcurrent to the fault monitoring circuit using the signal.

* * * * *